United States Patent [19]

Itako

[11] Patent Number: 5,019,695
[45] Date of Patent: May 28, 1991

[54] PUNCHER AND METHOD OF CONTROLLING THE PUNCHER

[75] Inventor: Eiji Itako, Sakado, Japan

[73] Assignee: Kabushiki Kaisha Nippon Conlux, Japan

[21] Appl. No.: 437,367

[22] Filed: Nov. 15, 1989

[51] Int. Cl.$^5$ .................. G06C 11/08; G06F 15/12
[52] U.S. Cl. .................... 235/434; 235/437; 235/449; 235/462
[58] Field of Search .............. 235/434, 437, 454, 449, 235/462

[56] References Cited

U.S. PATENT DOCUMENTS

| 3,735,093 | 5/1973 | Kendall et al. | 235/434 |
| 3,818,189 | 6/1974 | Stone et al. | 235/437 X |
| 4,172,552 | 10/1979 | Case et al. | 235/434 X |
| 4,331,863 | 5/1982 | Sidline et al. | 235/454 |

FOREIGN PATENT DOCUMENTS

| 54-1125 | 1/1979 | Japan . |
| 57-58700 | 12/1982 | Japan . |
| 59-75367 | 4/1984 | Japan . |
| 61-68770 | 4/1986 | Japan . |
| 61-68771 | 4/1986 | Japan . |
| 61-123056 | 6/1986 | Japan . |
| 61-31908 | 7/1986 | Japan . |

Primary Examiner—David Trafton
Attorney, Agent, or Firm—Welsh & Latz, Ltd.

[57] ABSTRACT

A card puncher for punching as a yardstick of use a card for getting coupon tickets on and used as tickets on omibuses and electric trains, and a method of controlling the card puncher. Data on a target quantity of conveyance of the card correponding to a position where the card is punched is stored in memory. A card conveyer is driven to convey the card by a quantity corresponding to data on the target quantity of conveyance stored in the memeory. A quantity of coast of the card after the drive of the card conveyer is teminated is measured. If the sum of the target quantity of conveyance and the measured quantity of coast of the card is within a predetermined allowable limit, the card is punched. If otherwise, data on the target quantity of conveyance in the memory is corrected such that the sum falls within the predetermined allowable limit, the card is returned to a position where the punching starts and the punching operation is retried.

15 Claims, 11 Drawing Sheets

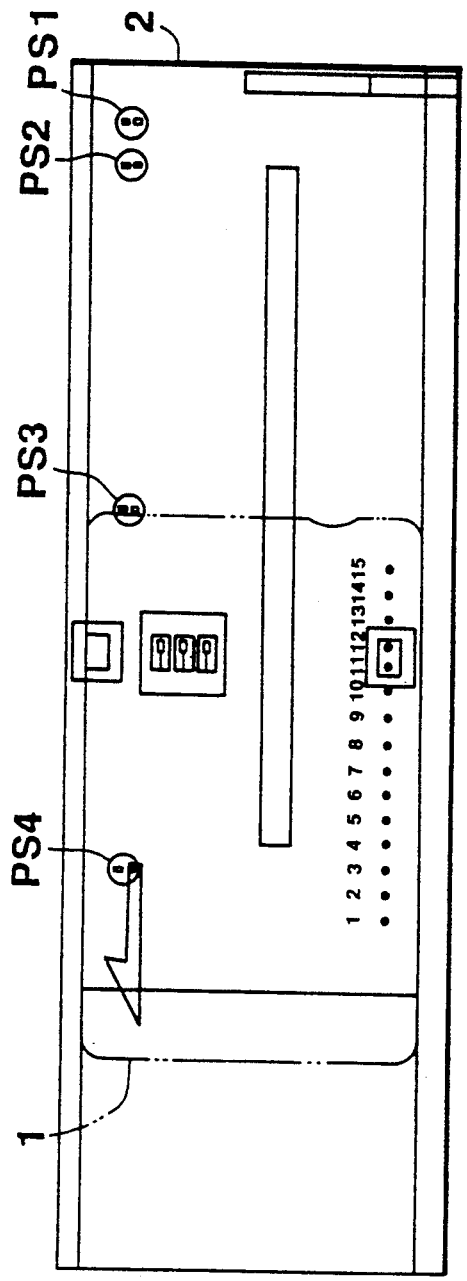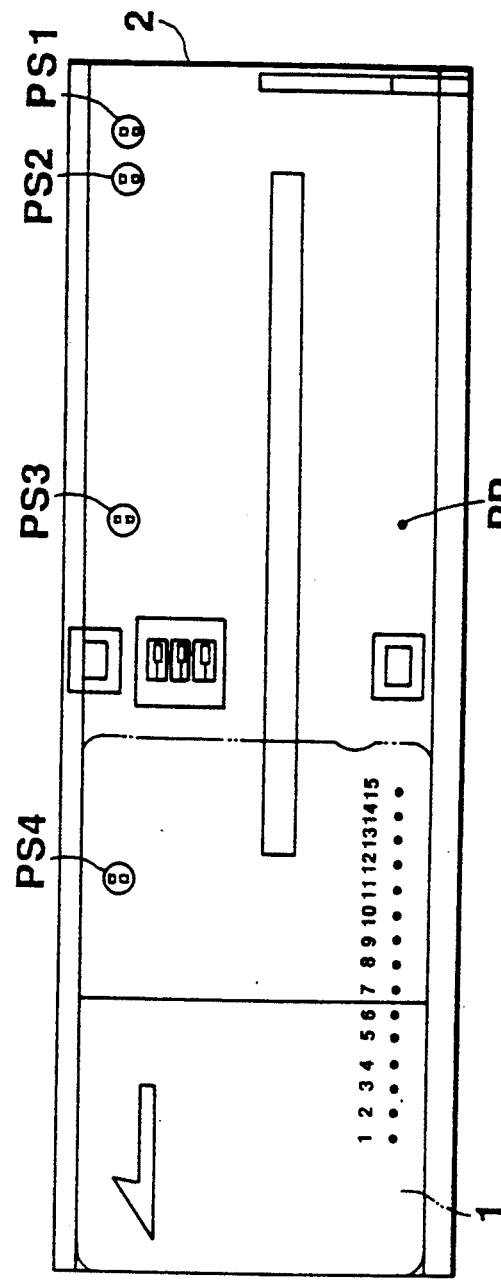

PUNCHER AND METHOD OF CONTROLLING THE PUNCHER

BACKGROUND OF THE INVENTION

1. Field of the Invention

The present invention relates to card punchers which punch cards as the yardstick of the sum of money paid by the cards used as coupon tickets, or to get tickets on omnibuses and/or electric trains and method of control the punchers.

2. Description of the Related Art

The use of cards as coupon tickets or to get tickets on omnibuses and/or electric trains have been proposed. Cards of such type store a predetermined number of records or a predetermined sum of money in the respective magnetic record sections formed on their backs. If the card is inserted into a card insertion slot in a card handling device, data on the sum of money stored in the magnetic record section is read, an amount of money corresponding to the use of the card is subtracted from the sum of the money and the card is then returned to the user. In order to visually display the remaining sum of money to the user, the card is punched at its predetermined position. Since the position of the punched hole indicates the remaining sum of money, it must be accurate.

To this end, an arrangement is proposed conventionally which when the card arrives at a position where it should be punched, it is stopped by a brake or a clutch and a punching mechanism is actuated to punch the card, or an arrangement is proposed in which a motor as a source of power to convey the card is slowed down to position a punched hole.

Published Unexamined Japanese Patent Application Sho No. 58-208874 discloses a further arrangement in which if a card comes close to a target position where it is punched, the card conveyer motor is switched from its forward rotation to its backward rotation to thereby slow down the card. If the interval between pulses generated corresponding to the rotational speed of the motor has more than a predetermined value, the motor is stopped to punch the card during its subsequent coasting operation.

In the arrangement in which a punched hole is positioned using the brake or clutch, the punching mechanism is complicated and large-sized, so that the space where the arrangement is to be accommodated is forced to be too small, and hence the arrangement cannot be used. In the arrangement in which the motor is slowed down, a time required for processing one card is increased, and an increase in the temperature of the motor would reduce the service life of the motor itself and the circuit parts in the vicinity of the motor.

In the arrangement of the Application Sho No. 58-208874, a mechanism such as a clutch or a brake is not required, but the punching timing is required to be selected in accordance with the state of the conveyer passageway in the punching mechanism to thereby increase the manufacturing cost undesirably since the punching operation is performed during the coasting of the card.

SUMMARY OF THE INVENTION

It is therefore an object of the present invention to provide a card puncher which has a simple small-scaled mechanism to position a punched hole with high accuracy, at high speed and at inexpensive manufacturing cost, and a method of control of the puncher.

In a card puncher according to the present invention, a memory stores data on a target quantity of conveyance of a card corresponding to the position where the card is punched. A card conveyer is driven to convey the card by a quantity corresponding to the data on the target quantity of conveyance stored in the memory. A quantity of coast of the card after the drive of the conveyer is terminated is measured. The card is punched if the sum of the target quantity of conveyance and the measured quantity of coast of the card is within an allowable limit. The data on the target quantity of conveyance is set in correspondence to the difference between the distance from a predetermined reference position to the position where the card is punched and a predicted coasting distance of the card.

The data on the target quantity of conveyance in the memory is corrected such that the sum of the target quantity of conveyance and the measured quantity of coast falls within a predetermined allowable limit if otherwise. The card is then returned to a position where the card punching is started, and card punching is retried.

In the correction, the sum of the target quantity of conveyance and the measured quantity of coast is compared with a standard value corresponding to the position where the card is punched. The target quantity of conveyance is increased by a quantity corresponding to the difference between the standard value and the sum if the sum is smaller than the standard value. The target quantity of conveyance is reduced by a quantity corresponding to the difference between the sum and the standard value if the sum is larger than the standard value.

A card puncher according to the present invention comprises a reversible motor for conveying a card, a conveyer belt driven by the motor for conveying a card to its a target punching position, a mechanism for punching the card, an encoder rotated synchronously with the motor for outputting pulses proportional in number to the quantity of conveyance of the card, a sensor for sensing the passage of the leading or trailing end of the card through a predetermined position on the conveyer belt, a memory for storing data on a standard value indicative of the quantity of conveyance of the card from the predetermined position to the punching position where the card is punched, and data on a target position indicative of a quantity of conveyance of the card toward the punching position, a punching position counter for receiving the data on the target position from the memory when the leading or trailing end of the card is sensed by the sensor and sequentially updating the data on the target position with an output pulse from the encoder, first control means for stopping the motor when the data on the target position in the punching position counter arrives at a predetermined value, a coast counter for measuring a quantity of coast of the card, after the motor is stopped, in accordance with output pulses from the encoder, and second control means for comparing the standard value with the sum of the data on the target position and the quantity of coast measured by the coast counter, directing the punching mechanism to punch the card if the error between the standard value and the sum is within an allowable limit, correcting the data on the target position stored in the memory by a quantity corresponding to the error if the error is out of the allowable limit, driving the motor to return the card to the starting position of the punching operation, and causing the punching mechanism to retry the punching operation using the corrected data on the target position.

According to the present invention, if the sensor senses the leading or trailing end of the card, the punching position counter is given from the memory target position data corresponding to a punch hole to be formed. The counter sequentially updates the target position data, given by the memory, in accordance with pulses output from the encoder. If the target position data arrives at a predetermined value, for example, of 0, by such updating operation, the first control means stops the motor.

The coast counter measures from the pulses output from the encoder a quantity of card coast after the motor is stopped. The second control means compares the sum of data on the target position of the punched hole to be formed and data of the measured quantity of coast with data on the standard value of the punched hole. If the error between the sum and the standard value is within an allowable limit, the second control means directs the punching mechanism to punch the card. If the error is out of the allowable limit, the second control means corrects the data on the target position corresponding to the punched hole stored in the memory by a quantity corresponding to the error, drives the motor to return the card to the start position of the punching operation and causes the punching mechanism to retry to punch the card in accordance with the data on the corrected target position.

As just described above, according to the present invention, when the card is carried to the target position in accordance with the data on the target quantity of conveyance indicative of the quantity of conveyance to the punching position, the data on the target quantity of conveyance is corrected by a quantity corresponding to the error between the real position of the punched hole and the standard position if the former position is out of the allowable limit from the latter position, and the card is repositioned in accordance with the corrected data. Therefore, high-accuracy positioning is achieved without using clutches and brakes, and the whole punching mechanism is reduced in scale and effectively accommodated in a small space. Since the card is conveyed at high speed, retry to position the card takes small time to thereby prevent adverse influence on the puncher due to an increase in the temperature of the motor. Since there is a learning effect in which the data on the target quantity of conveyance is corrected in accordance with the state of the real conveyance of the card, the operation of individually adjusting respective data on quantities of conveyance such as the target quantity of conveyance is eliminated even if the states of the conveyer passageways in punchers may differ from one another.

BRIEF DESCRIPTION OF THE DRAWINGS

FIGS. 9–13 show the transition of the card state.

DESCRIPTION OF THE PREFERRED EMBODIMENTS

Figure 1:
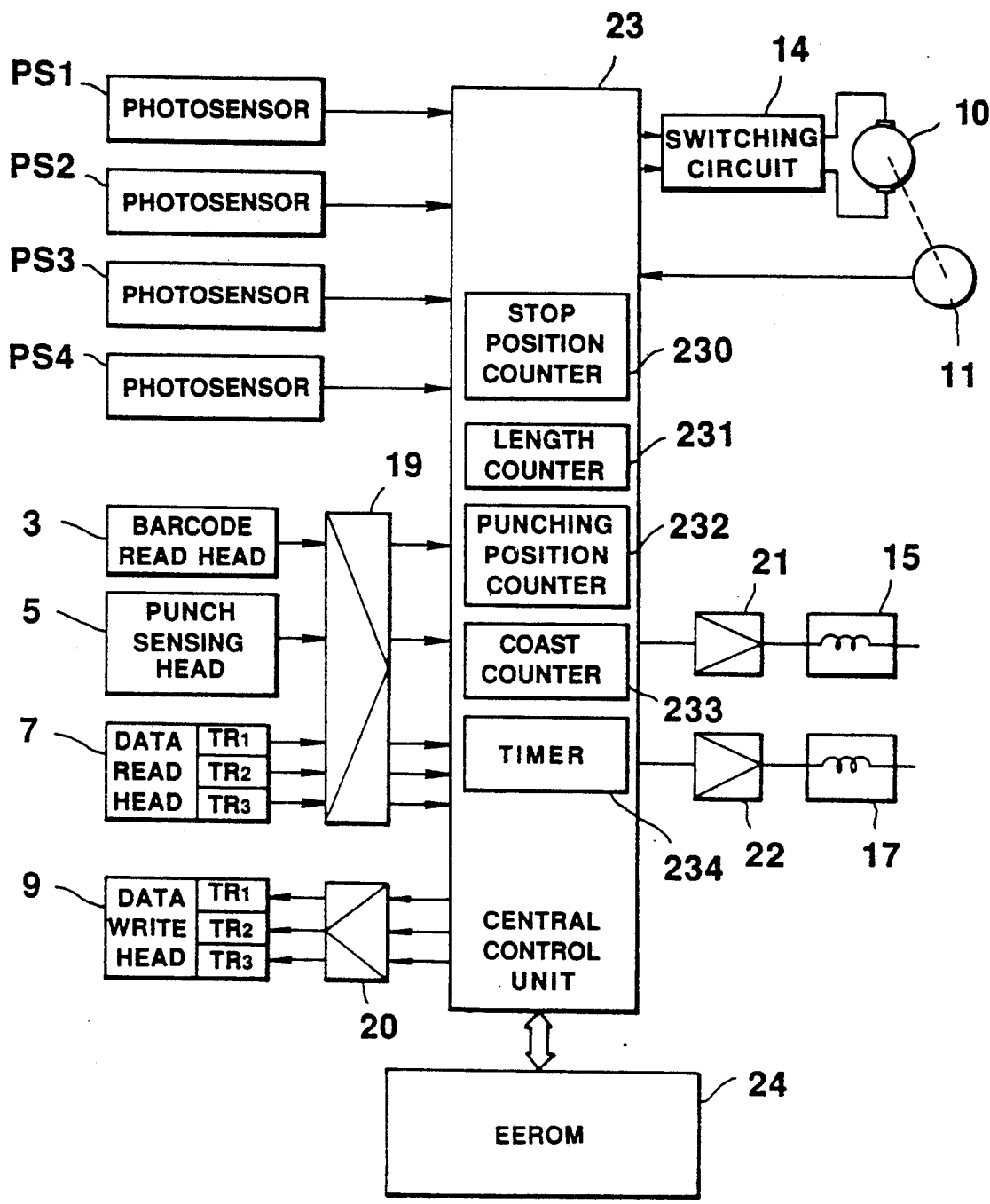
FIG. 1 is a block diagram of one embodiment of the present invention.
Figure 2:
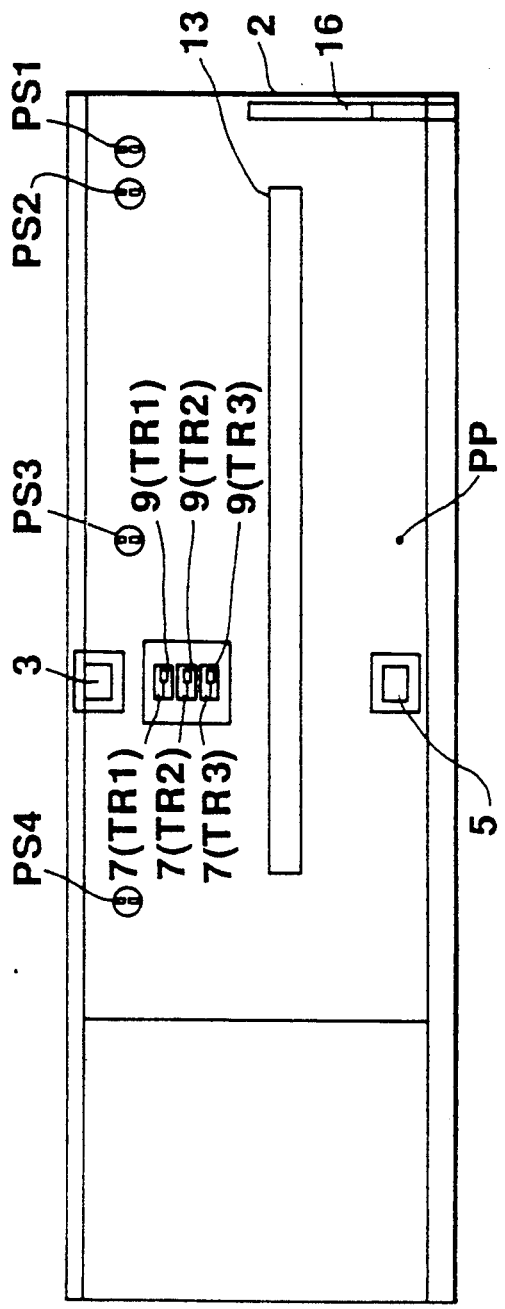
FIG. 2 is a plan view of a card conveyer passageway.

In FIGS. 1 and 2, a photosensor PS1 senses the insertion of a card 1 into an insertion slot 2 and provided on the conveyance surface at a position closest to insertion slot 2. A photosensor PS2 detects the length of the card 1 and is provided at a position slightly inward compared to photosensor PS1. A photosensor PS3 senses whether the trailing end of card 1 has arrived at a predetermined position. A photosensor PS4 senses whether card 1 has been conveyed to a stop position in the conveyance passageway, and is provided at a position shown in FIG. 2.

Figure 4:
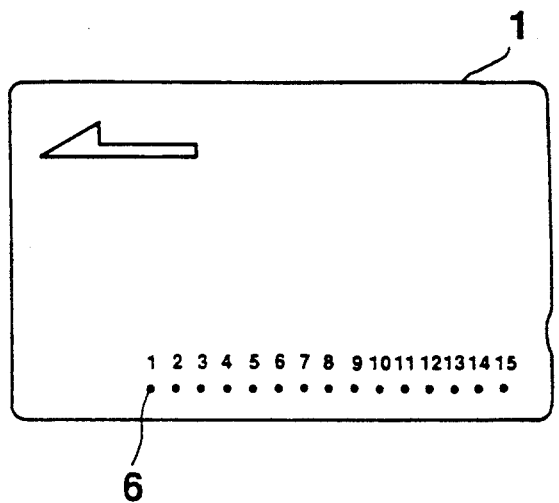
FIGS. 4(a), (b) are plan views of the front and back faces, respectively, of a card.
Figure 4:
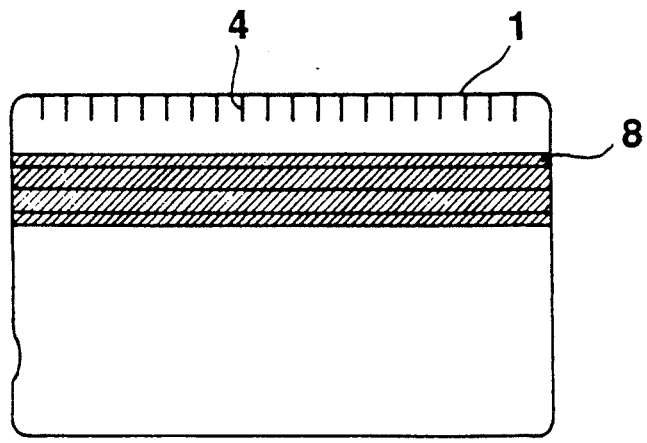
Figure 5:
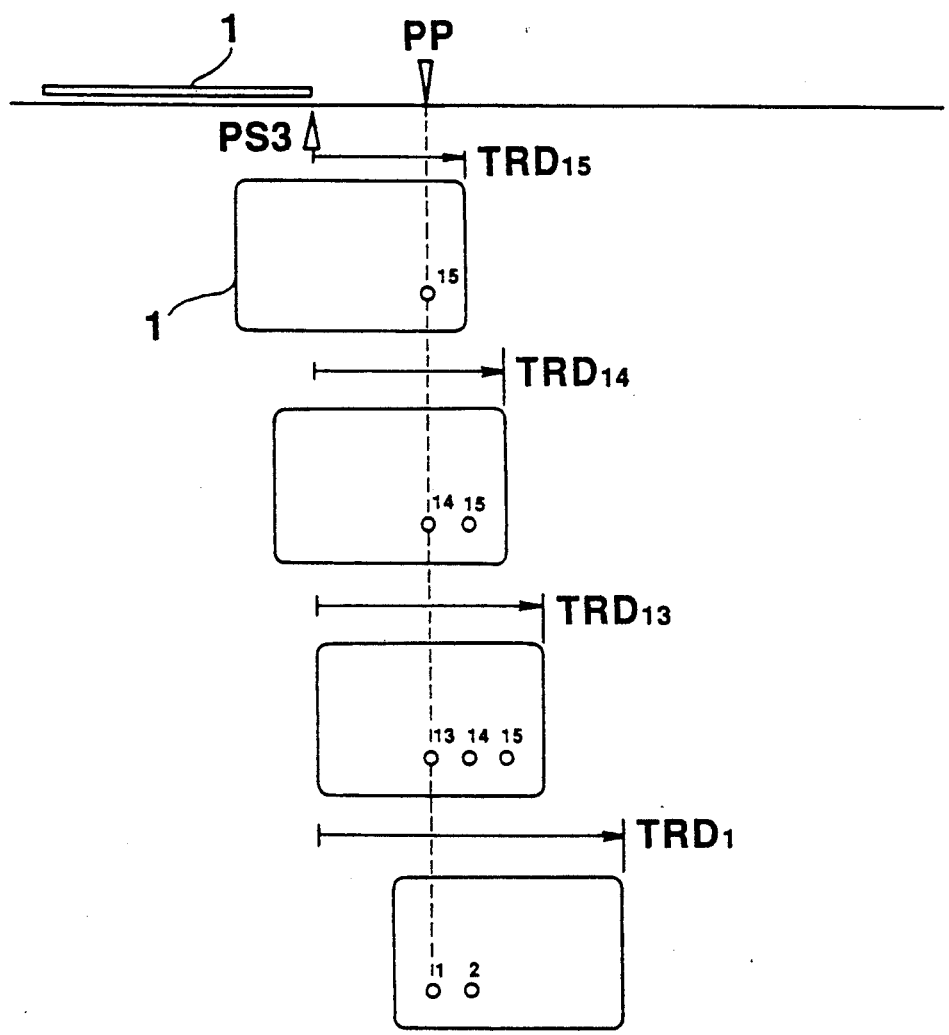
FIG. 5 illustrates data on the standard values of a quantity of conveyance to the punching position.

A read head 3 reads a barcode recorded on a longitudinal side of card 1 on its back as shown in FIG. 4(b). Barcode 4 includes the name of a company which issued the card, for example. A punch sensing head 5 magnetically senses a punch hole 6 formed in card 1. Card 1 has a total of 15 punch positions as shown in FIG. 4(a) which shows the front side of the card. A punch hole is formed at a position shown by one of "1"–"15" in accordance with a sum of money corresponding to the use of card 1.

As shown in FIG. 4(b) which shows the back of card 1, a data read head 7 reads data recorded in magnetic recording section 8 formed on the back of card 1. Magnetic recording section 8 is composed of a total of three tracks TR1–TR3 and hence data read head 7 is for the three tracks. There are in magnetic recording section 8 records such as data on the sum of money corresponding to the use of the card. Data write head 9 records data on a sum of money corresponding to the use of the card into magnetic recording section 8. In FIG. 2, read and write heads 7 and 9 are shown by 7(TR1)–7(TR3) and 9(TR1)–9(TR3) corresponding to the tracks.

Figure 3:
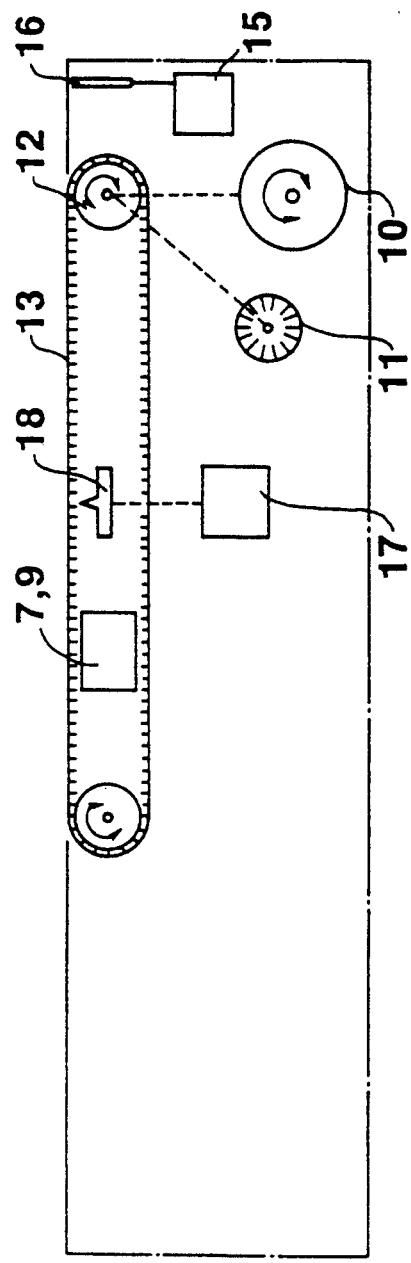
FIG. 3 is a side view of the conveyer passageway.

Motor 10 is a source of power to carry card 1, and includes a reversible DC motor, for example. Rotary encoder 11 rotates synchronously with motor 10 and generates pulses corresponding in number to the quantity of rotation of the motor. As shown in FIG. 3, the rotational shaft of motor 10 is coupled to pinch roller 12 the rotation of which is transmitted to conveyer belt 13 to thereby drive the belt in the direction of arrow and hence carry card 1 on the belt. Rotary encoder 11 is coupled to the rotational shaft of pinch roller 12 to generated pulses corresponding in number to a quantity of motor rotation or a quantity of card conveyance by conveyer belt 13.

Turning again to FIG. 1, switching circuit 14 switches the direction of motor rotation by changing the polarity of a voltage applied across motor 10. Shutter solenoid 15 actuates shutter 16 provided at card insertion slot 2 as shown in FIGS. 2 and 3. Shutter 16 is open before card insertion and closed immediately after card insertion, reopened after a series of processes including the punching operation has been completed and then returns card 1.

Punching solenoid 17 forms a punched hole 6 and is driven when the target position of a hole in the card coincides with punching pin 18 (FIG. 3). The position of punching pin 18 is shown by PP in FIG. 2.

Amplifier 19 amplifies the signals read by heads 3, 5 and 7. Amplifier 20 amplifies a write signal input to write head 9. Amplifier 21 and 22 amplify drive signals input to solenoids 15 and 17, respectively. Central control unit 23 controls the read/write of data on the sum of money corresponding to the use of the card recorded in magnetic recording section 8, and the punching operation. In order to control the punching operation, control unit 23 includes stop position counter 230, length counter 231, punching position counter 232, coast counter 233, and timer 234. Memory (EEROM) 24 beforehand stores programs necessary for reading and writing data on the sum of money corresponding to the use of card 1 and constants which are standard value data TRD1-TRD15 which determine quantities of conveyance to punch holes "1"–"15" from the position of the card trailing end sensed by photosensor PS3 and data on target quantities of conveyance P1-P15 to convey card 1 with the respective punch positions as targets.

The operation of the card puncher will now be described with reference to the flowcharts of FIGS. 6 and 7, the timing chart of FIG. 8, and the transition diagrams of the card status of FIGS. 9-13.

Figure 6:
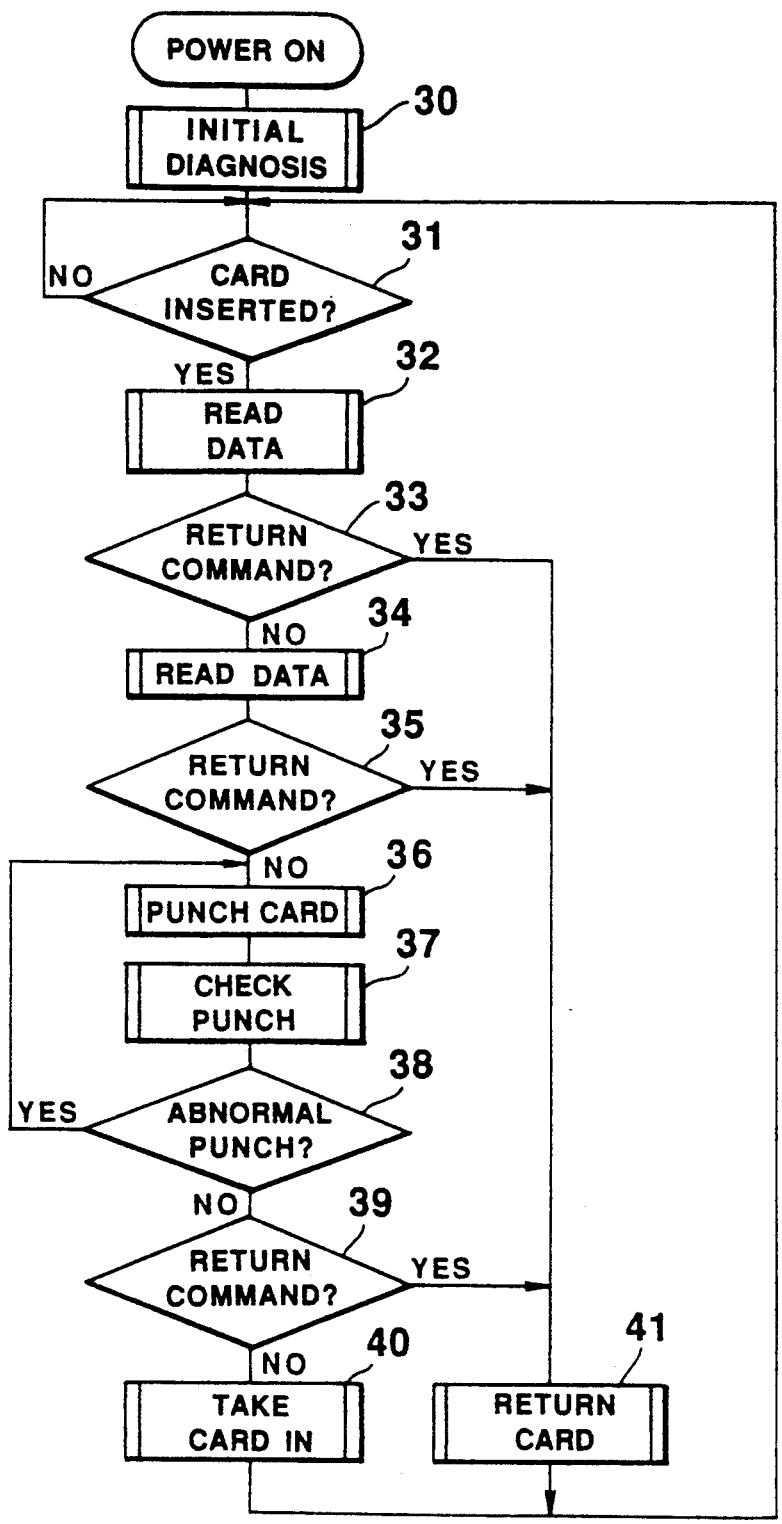
FIG. 6 is a flowchart indicative of the whole processing of a card.

FIG. 6 is a flowchart indicative of the whole operation of the card puncher covering the card insertion to the card return. If the power source is turned on, central control unit 23 makes an initial diagnosis of whether there are any abnormalities in the elements of the puncher (step 30). Thereafter, if card 1 is inserted and a detection signal indicative of this fact is inputted by photosensor PS1 into central control unit 23 (step 31), the control unit drives motor 10 forwardly. Thus, card 1 is carried by rotation of conveyer belt 13, and the position of the card changes sequentially in the order of the state of FIG. 9—the state of FIG. 10—the state of FIG. 11—the state of FIG. 12.

Figure 9:
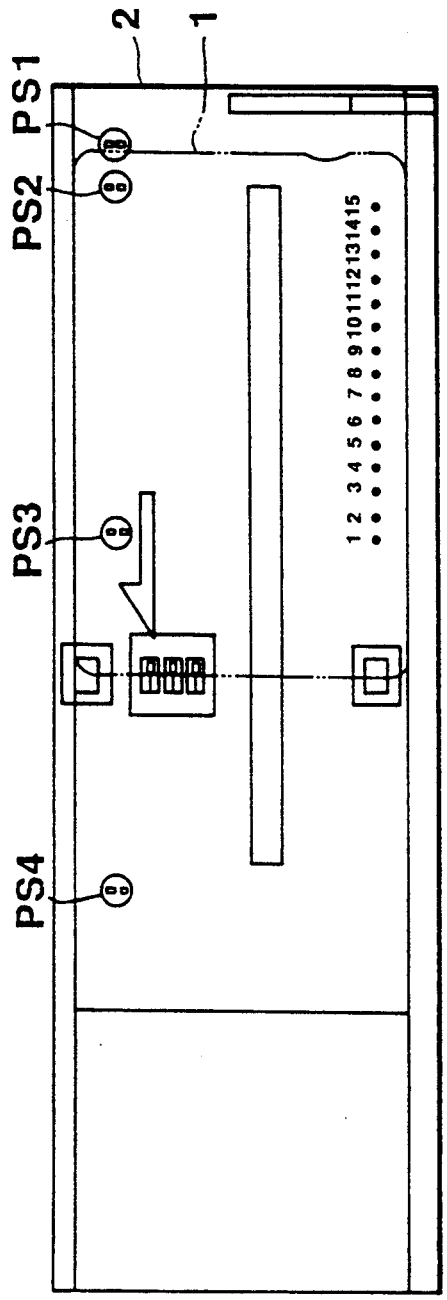
Figure 10:
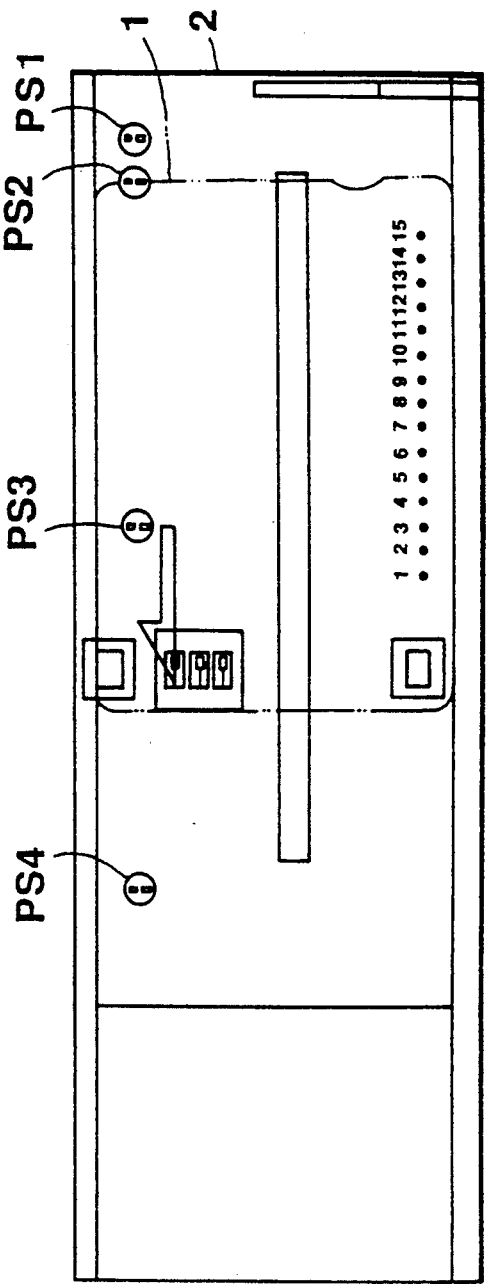

As shown in FIG. 9, when the trailing end of card 1 passes through photosensor PS1, the leading end of card 1 should arrive at the position of read and write heads 7 and 9, so that central control unit 23 causes read head 7 to read data recorded in magnetic recording section 8 from when photosensor PS1 is turned off (or senses no cards). If the leading end of card 1 is sensed by photosensor PS4, central control unit 23 causes stop position counter 230 to count pulses output by rotary encoder 11 since photosensor PS4 was turned on in order to stop card 1 at the stop position shown in FIG. 12. If the count arrives at a value corresponding to the stop position, motor 10 is stopped.

Thus the data on card 1 recorded in magnetic recording section 8 is all read (step 32). Barcode 4 recorded on a longitudinal side of card 1 is also read by barcode read head 3, and the read data is input to central control unit 23 and temporarily stored in memory 24. Central control unit 23 determines a sum of money corresponding to the use of card 1 in accordance with the read data. If the sum of money is insufficient or if the read card is of a different type, a return command is issued to thereby reverse motor 10 and card 1 is then returned out of insertion slot 2 (step 33, 41). If the card is not to be returned, a shift is made to step 34 directed to data writing to update data on the remaining sum of money in magnetic recording section 8.

In that case, central control unit 23 reverses motor 10 to return card 1 from the stop position of FIG. 12 to the initial position of FIG. 9, and then drive motor 10 forwardly for conveying purposes. In this process, data on the remaining sum of money in the recording section 8 is updated by write head 9. If there are any conditions for returning card 1, for example, since there is no need for punching the card after the data writing, motor 10 is reversed to return card 1 (step 35).

Figure 13:
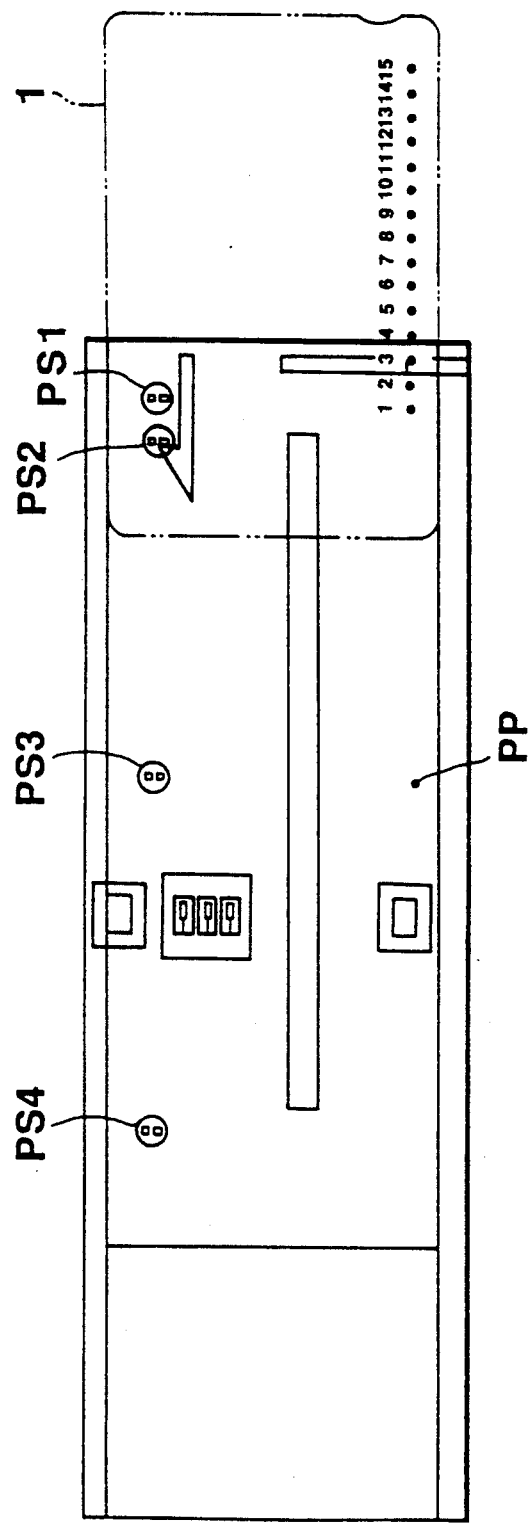

If updating data on the remaining sum of money is completed, central control unit 23 returns card 1 from the stop position of FIG. 12 to the initial position of FIG. 9 to shift to the punching process (step 36). Thereafter, it drives motor 10 forwardly, to convey card 1 again toward the stop position of FIG. 12. If the card arrives at the stop position, motor 10 is reversed to carry card 1 toward insertion slot 2. Central control unit 23 actuates punching solenoid 17 in the course of card returning to its initial position of FIG. 9 to punch the card at the position of one of the numbers "1"–"15" corresponding to the remaining sum of money. If a punched hole 6 is formed, it is checked whether the hole is formed normally or not (step 37). In the hole checking process, card 1 is conveyed from its initial position of FIG. 9 to its stop position of FIG. 12 and it is determined whether punched hole 6 is formed normally or not in accordance with the signal from hole sensing head 5. If punched hole 6 is not formed normally (step 38), card 1 is returned to its initial position of FIG. 9, and the punching operation at step 36 is executed again. If the punching check is ended, motor 10 is reversed to return card 1 out of insertion slot 2, as shown in FIG. 13. If conditions, for example, of an illegal use of the card are found, a take-in command is issued to take card 1 into the puncher (step 40).

Therefore, card 1 goes and returns once at each of steps 32, 34, 36 and 37, and hence completes a series of processes by going and returning four times in all. Shutter 16 is closed by shutter solenoid 15 to thereby inhibit the insertion of the next card until the series of processes are completed.

When central control unit 23 reads data at step 32, it causes length counter 231 to count output pulses from rotary encoder 11 produced from when photosensor PS2 is turned on to when it is turned off. It determines whether the length of card 1 is normal or not in accordance with the count value.

The punching operation which is the main operation in the present invention will now be described with respect to the flowchart of FIGS. 7(a) and (b) and the timing chart of FIG. 8. Punched hole 6 is formed in the course of card conveyance from the card stop position of FIG. 12 to the initial card position of FIG. 9.

Figure 7A:
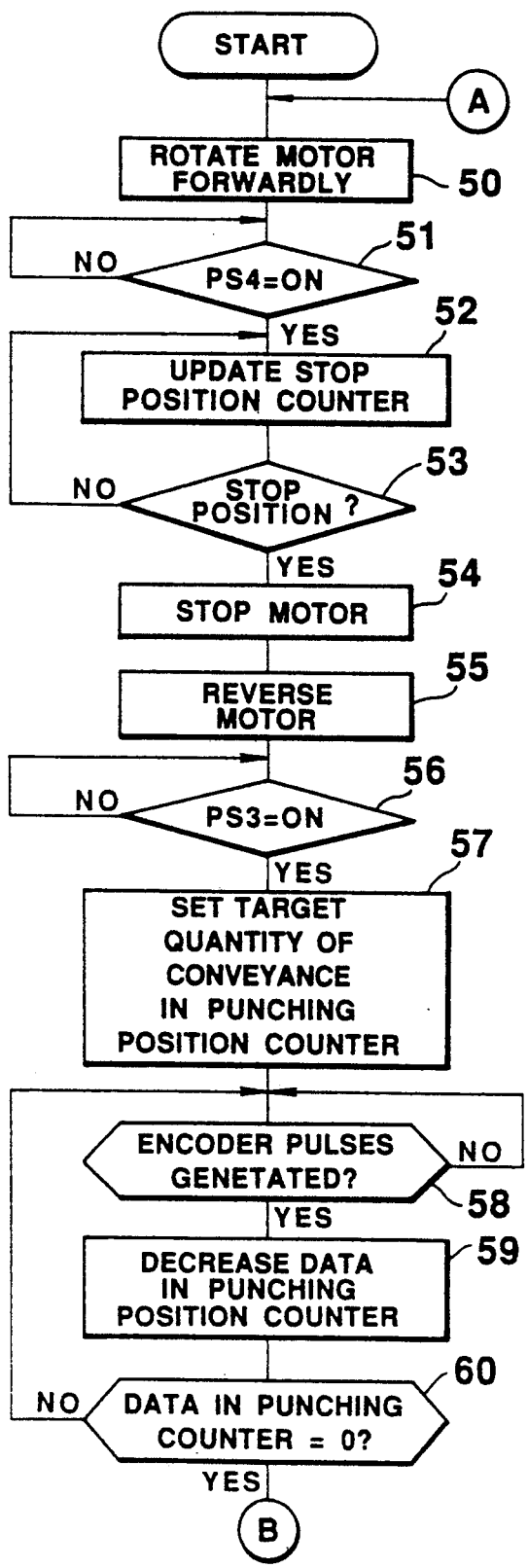
FIGS. 7(a) and (b) are flowcharts indicative of the details of a punching operation.
Figure 7B:
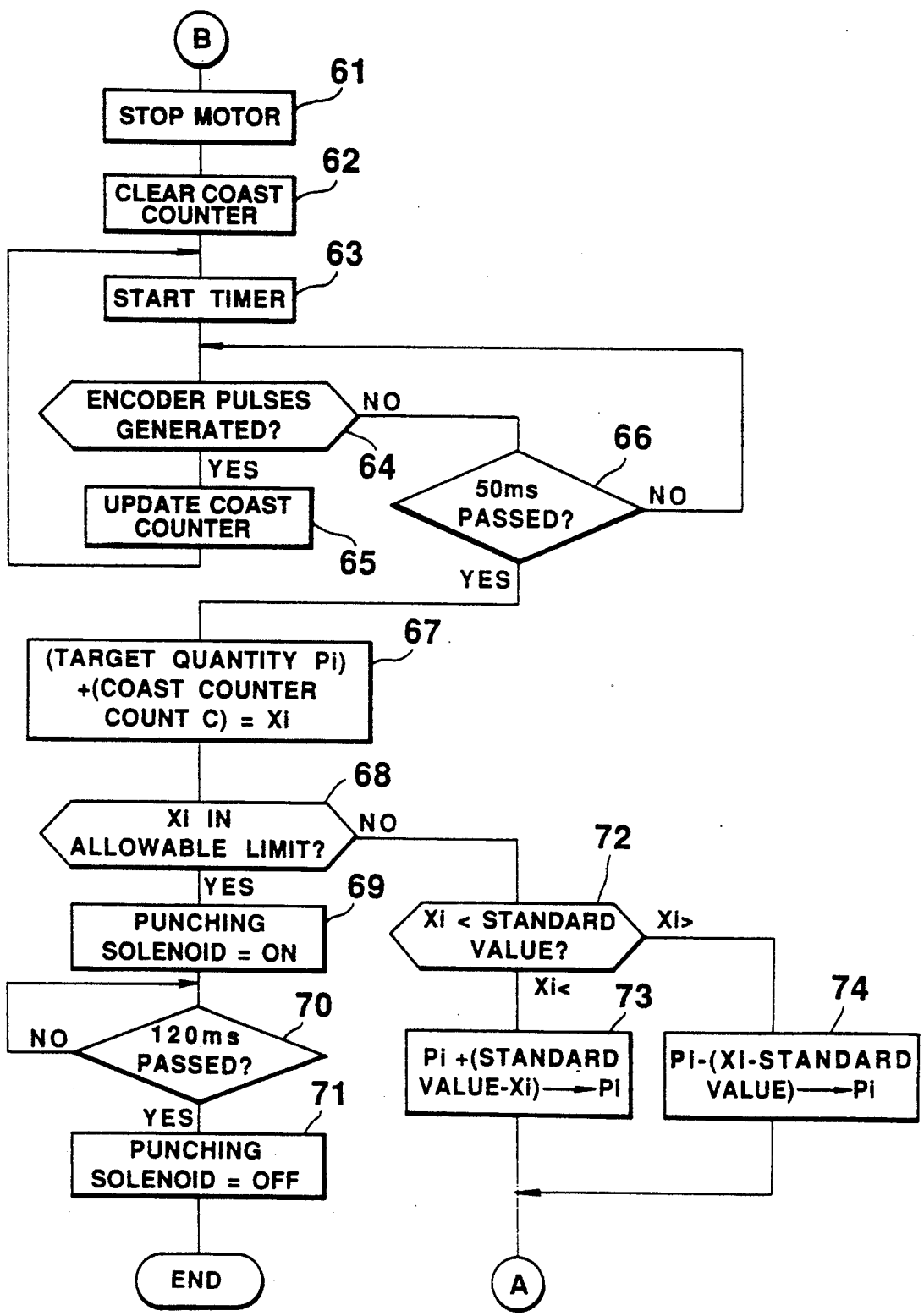
Figure 8:
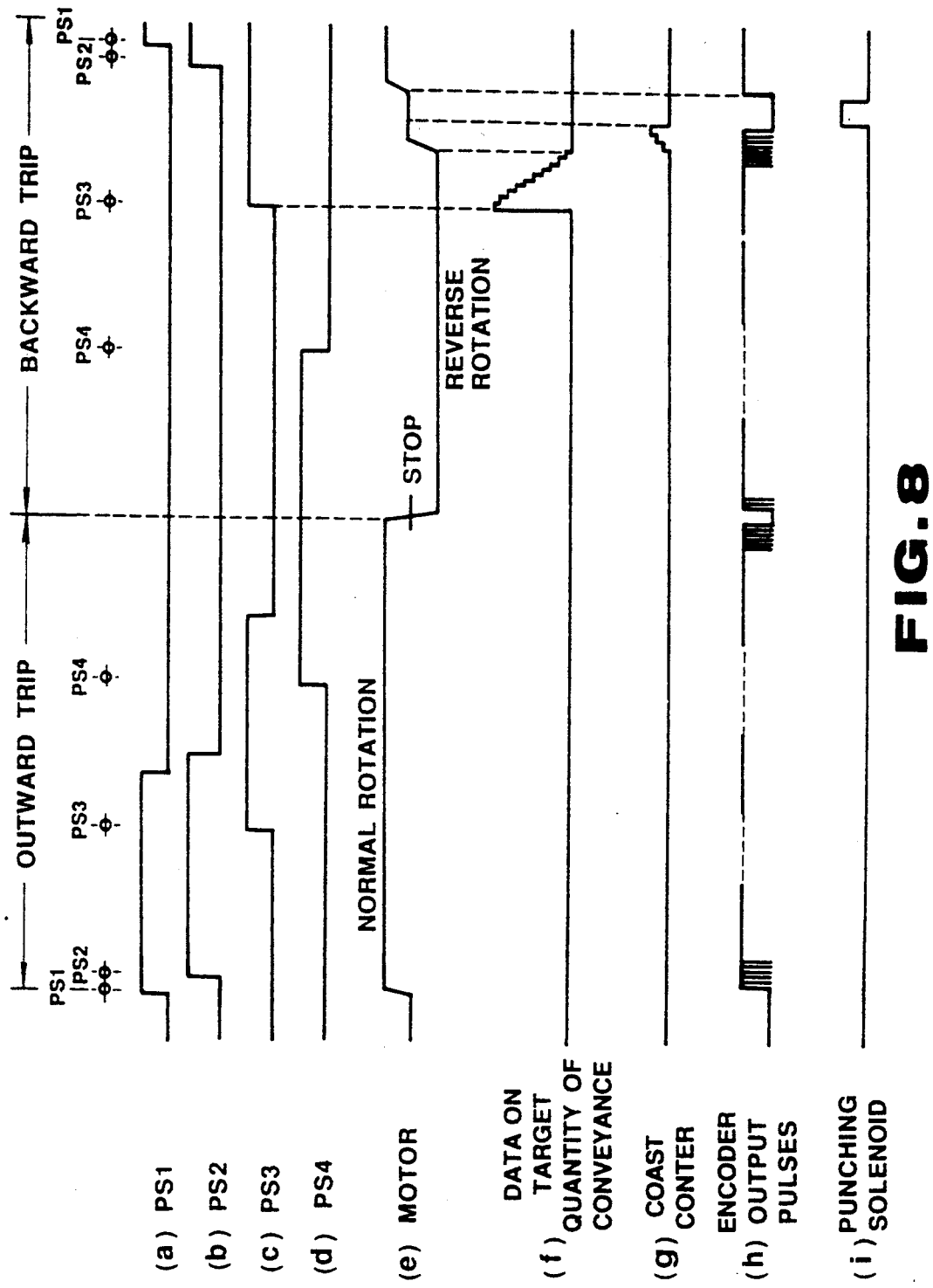
FIGS. 8(a–i) is a timing chart indicative of the punching operation.

In FIGS. 7(a) and (b), central control unit 23 drives motor 10 forwardly via switching circuit 14 to convey card 1 from its initial position to its stop position (step 50). When the leading end of card 1 passes through the position of photosensor PS4, central control unit 23 causes stop position counter 230 to count output pulses from rotary encoder 11 when the output of photosensor PS4 is turned on. If the count arrives at a value corresponding to the stop position, the central control unit stops motor 10 (steps 51-54). Thereafter, central control unit 23 reverses motor 10 via switching circuit 14 to convey card 1 toward card insertion slot 12 (step 55).

Thus, when the trailing end of card 1 passes through the position of photosensor PS3 to thereby turn on photosensor PS3, central control unit 23 reads data Pi on a target quantity of conveyance where i=1-15, corresponding to the position where the card is punched, and sets the data in punching position counter 232 (step 57). If the quantity of conveyance of the card from the position where the photosensor PS3 senses the trailing end of card 1 to the position of punching pin 18 which the number "15" in card 1 arrives at corresponds to the number of output pulses, "10", from rotary encoder 11 when, for example, a punched hole should be formed at the position of the number "15", "10±α" (α=any value in consideration of a slip, for example) is set in punching position counter 232. FIG. 8(f) shows setting of data Pi on the target quantity of card conveyance. FIGS. 8(a)–(d) show the output signals from photosensors PS1-PS4; FIG. 8(e), the rotational state of the motor; FIG. 8(g), the count in the coast counter 233; FIG. 8(h), output pulses from rotary encoder 11; and FIG. 8(i), a drive signal for punching solenoid 17.

Central control unit 23 subtracts by "1" data Pi on the target quantity of conveyance in punching position counter 232 each time rotary encoder 11 generates a single pulse (steps 58, 59). By this decrement, output pulses from the encoder equal in number to Pi are generated to stop motor 10 if Pi in counter 232 arrives at "0" (steps 60, 61). Thereafter, coast counter 233 is cleared, a timer value of 50 ms is set in timer 234 to monitor the quantity of coast and the timer is then started (steps 62, 63).

Motor 10 rotates for a predetermined time due to its inertia and the inertia of conveyer belt 13 even if a stop command is input thereto. Therefore, card 1 also coasts. Central control unit 23 determines that the card is coasting if even a single pulse is generated from the encoder within the timer time of 50 ms to thereby cause counter 233 to count output pulses from the encoder during the coasting (steps 64, 65). Thus, the count in counter 233 sequentially increases as shown in FIG. 8(g). If no pulses are generated from the encoder within the timer time, the central control unit determines that the coasting is stopped (step 66), data Pi on the target quantity of conveyance and count C in counter 233 are added, and the result of the addition Xi represents the actual quantity of conveyance of card 1 after the motor stop command is issued (step 67). It is checked whether the actual quantity of conveyance Xi is within an allowable limit. Since the data TRDi (i=1-15) on the standard value representing the quantity of conveyance from a reference position to the punching position is beforehand stored in memory 24, central control unit 23 compares data TRDi with the result of the addition Xi and determines that the card has stopped within the allowable limit if the error is within, for example, "±2". The control unit drives punching solenoid 17 for a time of 120 ms to cause a punched hole to be formed at the target position (steps 69-71). However, if the error between Xi and TRDi is out of the allowable limit, it is checked whether Xi>TRDi or not. If Xi<TRDi, it is determined that card 1 has not arrived at its target position. Therefore, "Pi+(TRDi−Xi)" is calculated and the result is employed as a new quantity of conveyance Pi, namely, the target quantity of conveyance Pi is increased by a quantity corresponding to the error. Conversely, if Xi>TRDi, the actual quantity of conveyance is too much, so that "Pi−(Xi−TRDi)" is calculated and the target quantity of conveyance Pi is decreased by a quantity corresponding to the error (steps 72-74). The data Pi on the corrected target quantity of conveyance is stored as the latest value in memory 24 and processes in step 50 and subsequent steps are again executed.

Thus, card 1 is positioned accurately at its target position and punched so as to form punch hole 6. Thereafter, as long as the conditions for card coasting along the conveyer passageway do not change, control of the punch position is provided in accordance with the data Pi on the corrected target quantity of conveyance. FIG. 8 illustrates by broken lines the drive timing of the solenoid when card 1 is conveyed to its normal or correct position.

As described above, according to the present invention, if the actual position of the card is out of the allowable limit for the standard position when it has been conveyed to its target position in accordance with data Pi on the target quantity of conveyance representing the quantity of conveyance to the position where punch hole 6 should be formed, data Pi itself is corrected by a quantity corresponding to the error between the actual position of the card and its target position, the card is again positioned in accordance with data Pi on the corrected quantity of conveyance, so that high accuracy positioning is achieved without using a clutch or a brake and the whole mechanism is reduced in size. Since card 1 is conveyed at high speed, the punching time is small even if repositioning is tried. Since there is a learning effect in which data Pi on the target quantity of conveyance is corrected in accordance with the actual state of conveyance, adjusting the respective data on quantities of conveyance in punchers is not required even if the states of conveyance passageways in the punchers may differ from one another to thereby reduce the manufacturing cost of the puncher.

While, in the particular embodiment, card 1 having magnetic recording section 8 has been described as an example, the present invention may be applicable to various card-like mediums such as pieces of paper, admission tickets and other tickets.

While the reference point from which the actual amount of conveyance to the punching position is measured is set at the position of photosensor PS3, it may be set at the position of photosensor PS4. It should be noted that since PS3 is closer to the punching pin than PS4, setting the reference point at the photosensor PS3 provides higher positioning accuracy.

What is claimed is:

1. A card puncher comprising:
   means for storing data on a target quantity of conveyance of a card corresponding to a position where the card is punched;
   means for conveying the card;
   means for driving the conveying means by a quantity corresponding to the data on the target quantity of conveyance;
   means for measuring a quantity of coast of the card after the drive of the conveying means by the drive means is terminated; and
   means for punching the card if a sum of the target quantity of conveyance and the measured quantity of coast of the card is within an allowable limit.

2. A card puncher according to claim 1, wherein the data on the target quantity of conveyance is set in correspondence to a difference between a distance from a predetermined reference position to the position where the card is punched and a predicted coasting distance of the card.

3. A card puncher according to claim 1, wherein the conveying means comprises:
   a motor; and
   a conveyer belt driven by the motor for conveying the card;

4. A card puncher according to claim 3, wherein the driving means drives the motor until the quantity of card conveyance arrives at a distance corresponding to the target quantity of conveyance.

5. A card puncher according to claim 1, wherein the measuring means comprises:
   pulse generator means provided in the conveying means for generating a pulse each time the card is conveyed over a predetermined unit distance; and
   counter means for counting pulses generated by the pulse generator means until the conveyance of the card by the conveying means is terminated.

6. A card puncher according to claim 1, further including means for correcting the data on the target quantity of conveyance in the memory means such that the sum of the target quantity of conveyance and the measured quantity of coast falls within a predetermined allowable limit if otherwise.

7. A card puncher according to claim 6, wherein the correcting means comprises:
   means for comparing the sum of the target quantity of conveyance and the measured quantity of coasting with a standard value corresponding to the position where the card is punched; and
   means for increasing the target quantity of conveyance by a quantity corresponding to the difference between the standard value and the sum when the sum is smaller than the standard value, and for reducing the target quantity of conveyance by a quantity corresponding to the difference between the sum and the standard value if the sum is larger than the standard value.

8. A card puncher according to claim 1, further comprising means for correcting data on the target quantity of conveyance in the memory means such that the sum of the quantity of conveyance and the measured quantity of coast falls within the predetermined allowable limit if otherwise, returning the card to a position where the card starts to be punched, and retrying to punch the card.

9. A card puncher comprising:
   a reversible motor;
   a conveyer belt driven by the motor for conveying a card to its target punching position;
   a mechanism for punching the card;
   an encoder rotated synchronously with the motor for outputting pulses proportional in number to the quantity of conveyance of the card;
   a sensor for sensing the passage of a leading or trailing end of the card through a predetermined position on the conveyer belt;
   a memory for storing data on a standard value indicative of the quantity of conveyance of the card from the predetermined position to the punching position where the card is punched, and data on a target position indicative of a quantity of conveyance of the card toward the punching position;
   a punching position counter for receiving the data on the target position from the memory when the leading or trailing end of the card is sensed by the sensor and sequentially updating the data on the target position with output pulses from the encoder;
   first control means for stopping the motor when the data on the target position in the punching position counter arrives at a predetermined value;
   a coast counter for measuring a quantity of coast of the card, after the motor is stopped, in accordance with output pulses from the encoder; and
   second control means for comparing the data on the standard value with the sum of the data on the target position and the data on the quantity of coast measured by the coast counter, directing the punching mechanism to punch the card if the error between the data on the standard value and the sum is within an allowable limit, correcting the data on the target position stored in the memory by a quantity corresponding to the error if the error is out of the allowable limit, driving the motor to return the card to the starting position of the punching operation, and causing the punching mechanism to retry the punching operation using the corrected data on the target position.

10. A card puncher according to claim 9, wherein the memory stores:
    the data on the standard value indicative of the quantity of conveyance of the card from the predetermined position to the punching position where the card is punched, and the data on the target position indicative of a quantity of conveyance of the card toward the punching position, disposed in correspondence to each of a plurality of punched holes.

11. A method of controlling a card puncher comprising the steps of:
    driving a card conveying means until a quantity of card conveyance arrives at a predetermined target quantity of conveyance corresponding to a position where a card is punched;
    measuring a quantity of coast of the card after the drive of the card conveying means is terminated; and
    punching the card if the sum of the target quantity of conveyance and the measured quantity of coast of the card is within a predetermined allowable limit.

12. A method of controlling a card puncher according to claim 11, wherein the target quantity of conveyance is set in correspondence to the difference between the distance from a predetermined reference position to a position where the card is punched and a predicted coasting distance of the card.

13. A method of controlling a card puncher according to claim 11, further comprising the step of:
    correcting the target quantity of conveyance such that the sum of the target quantity of conveyance and the measured quantity of coast of the card falls within the predetermined allowable limit, if otherwise.

14. A method of controlling a card puncher according to claim 13, wherein the correcting step comprises the steps of:
    comparing the sum of the target quantity of conveyance and the measured quantity of coast of the card with a standard value corresponding to the position where the card is punched; and
    increasing the target quantity of conveyance by a quantity corresponding to the difference between the sum and the standard value if the sum is smaller than the standard value, and reducing the target quantity of conveyance by a quantity corresponding to the difference between the sum and the standard value if the sum is larger than the standard value.

15. A method of controlling a card puncher according to claim 11, further including the steps of:
    correcting the target quantity of conveyance such that the sum of the target quantity of conveyance and the measured quantity of coast of the card falls within the predetermined allowable range, if otherwise, and returning the card to a position where the card starts to be punched and retrying the punching operation.

* * * * *